April 13, 1954 L. GOLDHAMMER 2,674,930
MINIATURE PICTURE CAMERA
Filed July 19, 1950

INVENTOR.
LEO GOLDHAMMER
BY Connolly and Hutz
HIS ATTORNEYS

Patented Apr. 13, 1954

2,674,930

UNITED STATES PATENT OFFICE 2,674,930

MINIATURE PICTURE CAMERA

Leo Goldhammer, Munich, Germany

Application July 19, 1950, Serial No. 174,735

5 Claims. (Cl. 95—31)

The present invention relates to a photographic roll film camera, particularly to one which may be supplied with the standard type of 35 millimeter motion picture film that is perforated along its edges. Such miniature picture cameras for taking snapshots on motion picture film are well known in the art.

The prior art cameras of the above type are usually supplied with film that has been wound on a spool and placed within a cassette or with film that has been rolled upon itself within a cartridge. When using a supply cassette, it is unnecessary to employ a second cassette within which the film is wound after exposure, because the film may be rewound into the supply cassette, after it has been entirely exposed. It is customary to place upon the spools of such miniature picture cameras a length of film sufficient for taking 36 pictures 24 x 36 millimeters in size. On the other hand, the cartridges into which the film is pushed, so that it will roll upon itself therein, generally contain a length of film that is sufficient for only 12 pictures of the above-mentioned size.

It is advantageous for the amateur in using his miniature picture camera not to be limited in his choice of the film supply container nor of the number of pictures to be taken. It is difficult to provide the desired versatility, because in the one case the exposed film is wound up in a clockwise direction upon a spool, while in the other case it must be pushed in a counterclockwise direction into a receiving cartridge. The requirements as to the manner of conducting the film are, therefore, fundamentally different, when using the two kinds of film supply containers.

The principal object of the present invention is to provide simple means whereby either type of supply container may be employed in the same camera. According to the invention the problem arising from the different requirements as to the manner of conducting the film is solved by adapting the film track to the particular film supply container employed. In order to be able to push the exposed film strip into the receiving cartridge satisfactorily and without loss of film, it is necessary to provide a film transport wheel directly adjacent to the cartridge, in addition to the usual film transport wheel that is located next to the picture opening. Until it reaches this added transport wheel, the film slides in the known manner on fixed guides located at both sides of the picture opening. In order to provide satisfactory conductance of the film up to the mouth of the receiving cartridge, the film track according to the invention is continued beyond the added transport wheel by means of a guide, that can be swung in and out of position. This removable guide serves in the manner of a bridge between the fixed film guides and the mouth of the receiving cartridge.

A particularly advantageous modification results by constructing the removable guide in the form of a right-angled lid. This lid is swung away from the zone of the added transport wheel and of the film, when employing a film take-up spool. It has proven to be advantageous to place the lid under the influence of a spring that continuously urges it against the added transport wheel, and to provide a catch for holding it in the open (ineffective) position. Furthermore, the lid is so formed and mounted, that the insertion of a spool-less receiving cartridge is made possible only after swinging the lid into its effective (closed) position at the added transport wheel (see Fig. 3).

The invention is illustrated in the accompanying drawings that show one form of construction by way of example. In these drawings.

Figure 1:
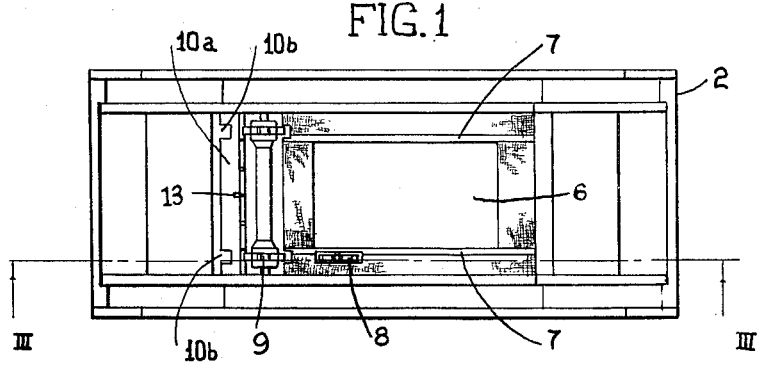
Fig. 1 is a rear view of the miniature picture camera with its back cover removed, showing the film guiding lid in its ineffective (open) position.
Figure 2:
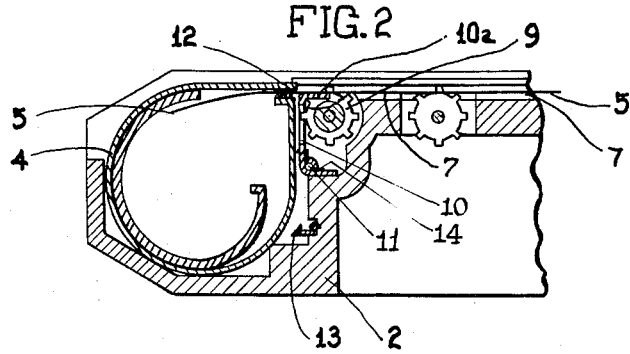
Fig. 2 is a side view (enlarged) in section of a portion of the miniature picture camera, wherein the film guiding lid is shown in its effective (closed) position (while the film is being pushed into a receiving cartridge).

In these drawings the exposed film receiving chamber 1 of the camera casing 2 is formed in such a manner that both take-up spools 3, as well as receiving cartridges 4, may be inserted therein. When using a film take-up spool 3, the film 5 passes over the fixed film guides 7 at both sides of the picture opening 6 and over the transport wheels 7 and 9 into the slit 3a in the stem 3b of the spool 3. The transport wheels 8 and 9 mesh with their teeth in the known manner in the perforations along the edges of the film 5 and serve both for limiting the advance of the film, as well as for transporting it. If one should now insert a receiving cartridge 4 into the chamber 1 of the camera casing 2 in place of the take-up spool 3, then the beginning of the film after insertion into the camera might readily be caught on the teeth of the transport wheel 9 and find its way between the camera casing and the outer wall of the receiving cartridge. In order to avoid this drawback, an angular or L-shaped film guiding lid or removable guide extension 10 is installed that can be swung about the hinge 11. The free end 10a of this guiding lid can serve as a bridge between the fixed film guides 7 and the mouth 12 of the receiving cartridge 4. As may be seen from Fig. 2, the free end 10a of the film lid 10 may rise between the teeth of the transport wheel 9. At the locations 10b the free end 10a of the lid 10 is cut away to provide clearance for the teeth of the transport wheel 9.

Figure 3:
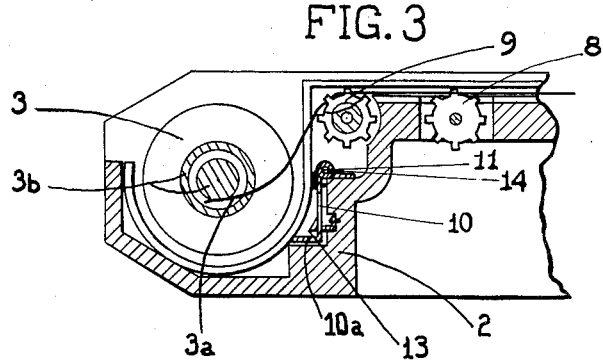
Fig. 3 represents the same view as in Fig. 2, however, while employing a film take-up spool with the film guiding lid swung away in the open (ineffective) position.

In Fig. 3 the film guiding lid 10 is shown in its ineffective position. Here one may also recognize that the film is wound in a clockwise direction upon the stem 3b of the take-up spool 3, whereas the film in the receiving cartridge rolls upon itself in a counter-clockwise direction (see Fig. 2). The film guiding lid 10 is held in its open position by a resilient catch 13 and is swung towards the film transport wheel 9 by means of a spring 14 upon release of the catch (see Fig. 2).

There is claimed:

1. A miniature camera having a film take-up chamber, a picture opening past which the film is transported to the chamber for selectable winding onto a take-up spool or a hollow take-up cartridge, a straight fixed film guide surface between said picture opening and said chamber defining the film transport path, a pair of film transport gears adjacent said guide surface for engaging and driving the film on said surface, and a movable film guide extension carried adjacent the guide surface where it opens into the chamber, said extension being movable between two positions in one of which it forms a continuation of the guide surface as a bridge to the mouth of a cartridge mounted in the chamber and in the other of which it is retracted out of the path of film moving onto a take-up spool mounted in the chamber.

2. The invention of claim 1 in which the camera includes a take-up winding mechanism connected for winding film onto a spool in the take-up chamber in a direction opposite that in which the film is wound in a take-up cartridge.

3. The invention of claim 1 in which the transport gears are positioned on the chamber side of the guide surface.

4. The invention of claim 1 in which the guide extension is positioned so that when in retracted position it interferes with the insertion of a cartridge in the take-up chamber.

5. The invention of claim 1 in which the camera includes spring means connected to hold the guide extension in at least one of the two positions.

References Cited in the file of this patent

UNITED STATES PATENTS

| Number | Name | Date |
|---|---|---|
| 1,225,184 | Segel | May 8, 1917 |

FOREIGN PATENTS

| Number | Country | Date |
|---|---|---|
| 139,246 | Great Britain | Mar. 4, 1920 |